(12) United States Patent
Nguyen et al.

(10) Patent No.: US 11,638,273 B2
(45) Date of Patent: Apr. 25, 2023

(54) TECHNIQUES FOR HANDLING COEXISTENCE OF MULTIPLE RADIO ACCESS TECHNOLOGY COMPONENTS IN A DEVICE

(71) Applicant: QUALCOMM Incorporated, San Diego, CA (US)

(72) Inventors: Tien Viet Nguyen, Bridgewater, NJ (US); Arjun Bharadwaj, Cupertino, CA (US); Sudhir Kumar Baghel, Hillsborough, NJ (US); Kapil Gulati, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 16/787,981

(22) Filed: Feb. 11, 2020

(65) Prior Publication Data
US 2020/0267742 A1    Aug. 20, 2020

Related U.S. Application Data

(60) Provisional application No. 62/806,650, filed on Feb. 15, 2019.

(51) Int. Cl.
*H04W 28/08*    (2009.01)
*H04W 72/12*    (2023.01)
(Continued)

(52) U.S. Cl.
CPC ... *H04W 72/1215* (2013.01); *H04W 28/0819* (2020.05); *H04W 72/0446* (2013.01);
(Continued)

(58) Field of Classification Search
CPC ... H04L 12/5695; H04L 47/74; H04L 12/413; H04W 72/04; H04W 72/082;
(Continued)

(56) References Cited

U.S. PATENT DOCUMENTS

2013/0337814 A1* 12/2013 Wong ............... H04W 48/20
                                                        455/438
2014/0198766 A1*  7/2014 Siomina ............ H04L 5/0053
                                                        370/330
(Continued)

FOREIGN PATENT DOCUMENTS

WO    2009086668 A1    7/2009
WO    2017082780 A1    5/2017

OTHER PUBLICATIONS

Maliheh et al., "Analysis of Uplink Scheduling for Haptic Communications", Sep. 26, 2018, pp. 1-8 (Year: 2018).*
(Continued)

*Primary Examiner* — Salvador E Rivas
(74) *Attorney, Agent, or Firm* — Arent Fox Schiff LLP

(57) ABSTRACT

Aspects described herein relate to managing coexistence of multiple radio access technology (RAT) components in a device. Information related to an upcoming time period can be sent to a first radio access technology (RAT) component from a second RAT component. The first RAT component can select a resource to transmit a first RAT packet to minimize collision with the upcoming time period of the second RAT.

21 Claims, 6 Drawing Sheets

(51) Int. Cl.
*H04W 72/0446* (2023.01)
*H04W 74/08* (2009.01)
*H04W 52/02* (2009.01)
*H04L 12/413* (2006.01)

(52) U.S. Cl.
CPC ....... *H04L 12/413* (2013.01); *H04W 52/0203* (2013.01); *H04W 74/08* (2013.01)

(58) Field of Classification Search
CPC ............. H04W 72/1226; H04W 72/12; H04W 72/1294; H04W 72/1278; H04W 28/0819; H04W 52/0203; H04W 74/08; H04J 11/0023
See application file for complete search history.

(56) References Cited

U.S. PATENT DOCUMENTS

| | | | | |
|---|---|---|---|---|
| 2016/0205704 | A1* | 7/2016 | Aiba | H04L 5/0044 370/329 |
| 2017/0127439 | A1* | 5/2017 | Gopal | H04W 72/1263 |
| 2017/0347271 | A1* | 11/2017 | Baldemair | H04W 72/1215 |
| 2017/0353893 | A1* | 12/2017 | Marwah | H04W 36/0022 |

OTHER PUBLICATIONS

R1-1713294, "Discussion on the NR-LTE self-interference issue", Aug. 21-25, 2017, pp. 1-6 (Year: 2017).*
R1-1900780, "Coexistence between NR V2X and LTE V2X", Jan. 21-25, 2019, pp. 1-6 (Year: 2019).*
Guangdong Oppo Mobile Telecom: "Discussion on the NR-LTE Self-Interference Issue", 3GPP Draft, 3GPP TSG RAN WG1 Meeting #90, R1-1713294, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051316101, 6 pages, Retrieved from the Internet: URL http://www.3gpp.org/ftp/Meetings_3GPP_SYNC/RAN1/Docs/, [retrieved on Aug. 20, 2017], Paragraph [0002].
International Search Report and Written Opinion—PCT/US2020/017982—ISAEPO—dated Jul. 21, 2020.
Partial International Search Report—PCT/US2020/017982—ISAEPO—dated May 18, 2020.
Qualcomm Incorporated: "Updated Summary of Coexistence Aspects in NR-V2X (Al 7.2 4.5)", 3GPP Draft, 3GPP TSG RAN WG1 Meeting Ad-Hoc Meeting 1901, R1-1901425, 3rd Generation Partnership Project, Mobile Competence Centre, 650, Route Des Lucioles, F-06921 Sophia-Antipolis Cedex, FR, vol. Ran WG1, No. Taipei, Taiwan, Jan. 21, 2019-Jan. 25, 2019, Jan. 25, 2019, XP051601338, 7 Pages, Paragraph [0002].

* cited by examiner

TECHNIQUES FOR HANDLING COEXISTENCE OF MULTIPLE RADIO ACCESS TECHNOLOGY COMPONENTS IN A DEVICE

CLAIM OF PRIORITY UNDER 35 U.S.C. § 119

The present Application for Patent claims priority to Provisional Application No. 62/806,650, entitled "TECHNIQUES FOR HANDLING COEXISTENCE OF MULTIPLE RADIO ACCESS TECHNOLOGY COMPONENTS IN A DEVICE" filed Feb. 15, 2019, which is assigned to the assignee hereof and hereby expressly incorporated by reference herein for all purposes.

BACKGROUND

Aspects of the present disclosure relate generally to wireless communication systems, and more particularly, to managing multiple radio access technology (RAT) radio components of a device for performing wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In V2X, devices can communicate with one another over resources of a sidelink channel. It may be possible that a device has multiple RAT components that may be capable of V2X communications in a given RAT, but the device may be capable of using, or may otherwise prefer to use, only one RAT component at a time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes sending information related to an upcoming time period to a first radio access technology (RAT) component of a device from a second RAT component of the device, and selecting, by the first RAT component, a resource to transmit a first RAT packet to minimize collision with the upcoming time period of the second RAT.

In another example, a method for wireless communication is provided. The method includes receiving one or more interruption parameters related to receiving communications of a first RAT using a first RAT component of a device over transmitting communications of a second RAT using a second RAT component of the device, and transmitting, at the device and based on the one or more interruption parameters, communications of the second RAT using the second RAT component to achieve an interruption level threshold.

In another example, an apparatus for wireless communication is provided that includes a transceiver, a memory configured to store instructions, and one or more processors communicatively coupled with the transceiver and the memory. The one or more processors are configured to send information related to an upcoming time period to a first RAT component of a device from a second RAT component of the device, and select, by the first RAT component, a resource to transmit a first RAT packet to minimize collision with the upcoming time period of the second RAT.

In another example, an apparatus for wireless communication is provided. The apparatus includes a transceiver, a memory configured to store instructions, and one or more processors communicatively coupled with the transceiver and the memory. The one or more processors are configured to receive one or more interruption parameters related to receiving communications of a first RAT using a first RAT component of a device over transmitting communications of a second RAT using a second RAT component of the device, and transmit, at the device and based on the one or more interruption parameters, communications of the second RAT using the second RAT component to achieve an interruption level threshold.

In a further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
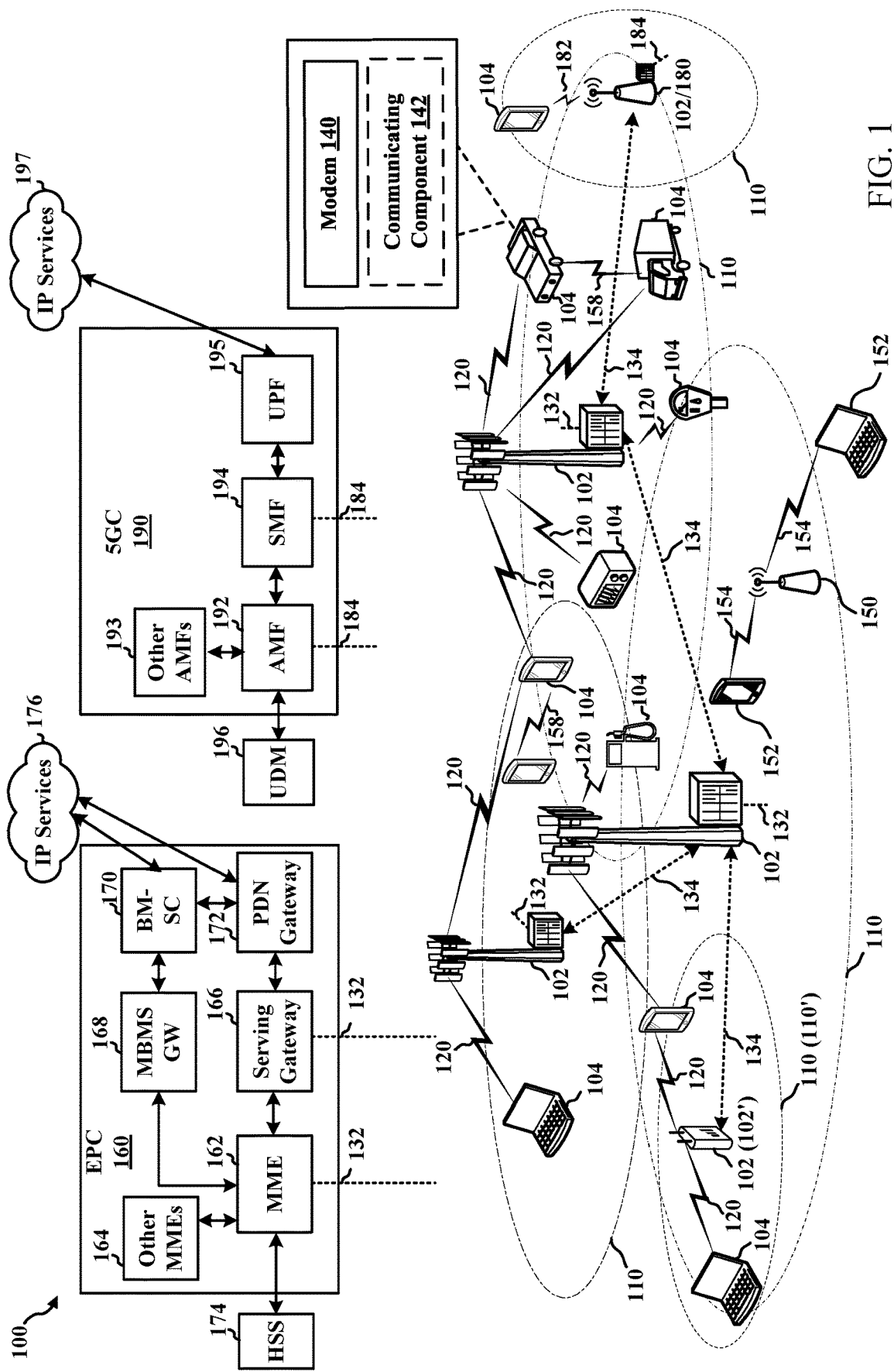
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to managing coexistence of multiple radio access technology (RAT) components in a device enabled for device-to-device (D2D) communications. As such, the concepts are generally described herein with respect to D2D communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in fifth generation (5G) new radio (NR) communication technologies, as well as long term evolution (LTE). Though aspects are generally described herein in terms of D2D/V2X communications, the concepts and techniques can be similarly applied more generally to substantially any type of wireless communications.

In an example, a device may be configured to communicate using both LTE V2X and NR V2X over respective sidelink channels. In one example, synchronization and time alignment may be provided among LTE and NR V2X sidelinks. In this example, LTE and NR V2X sidelinks may be assumed to be synchronized, and/or a subframe boundary alignment may be used between LTE and NR V2X sidelinks. For example, LTE and NR V2X sidelinks may be aware of the direct frame number (DFN) index in both carriers. Non-overlapping resource pools in the time domain can be accordingly configured (or pre-configured) for NR V2X and LTE V2X sidelinks. In this example, no information is exchanged between LTE and NR components within the UE. This long term time scale time division multiplexing example, however, may have an impact on latency, reliability, data rate, etc. requirements for some applications by limiting opportunities to access spectrum for both LTE and NR.

Accordingly, aspects described herein relate to dynamic examples for managing coexistence of multiple RAT components in a device. A RAT component can include various hardware or software components in the device that are associated with, or otherwise configured for, communications using a RAT. For example, a RAT component may include one or more antennas or other radio frequency (RF) modules configured to transmit and/or receiving signals of the RAT (e.g., at a frequency and/or according to a time division specified by the RAT), network protocol stacks (e.g., for encoding/decoding communications into or from wirelessly communicated signals), processors (or functions implemented using a common processor) configured to use the antennas, RF modules, network protocol stacks, etc. to process communications, and/or the like. A device may have a RAT component for each of multiple RATs.

For example, at a given device, the multiple RAT components can be managed in the case of transmitting communications over each of the RAT components, transmitting over one RAT component while scheduled for receiving over another RAT component (or vice versa), etc. Moreover, in an example, managing the multiple RAT components can be different between: 1) an initial transmission in a semi-persistent scheduling (SPS) scheme (or a single transmission in a single resource grant scheme); and (2) transmissions other than the initial transmission. For example, where resources scheduled for transmitting using one RAT are known (e.g., for transmissions other than an initial transmission or single transmission), these resources can be avoided when transmitting using another RAT. For an initial or single transmission, however, one RAT may be given priority in all cases, or priority or resource reservation information may be exchanged between RAT components beforehand to allow for scheduling transmissions around one another.

In another example, when transmitting using one RAT and receiving using another RAT, one RAT may be mostly prioritized (e.g., the RAT used for transmitting) and an interruption scheme can be defined or otherwise used for the receiving RAT. The parameters may be based on a priority level for transmitting using the one RAT. In any case, the device can manage transmitting using the one RAT so as not to exceed the interruption level defined for receiving using the other RAT. In another example, a priority of the receiving packet may be known (e.g., for a retransmission), and in this example, the one RAT transmission may be dropped in favor of receiving the other RAT packet.

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IIS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (B SS), an extended service set (ES S), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. For example, sidelink V2X communications may occur in a dedicated portion of spectrum such as the 5.9 GHz dedicated short range communications (DSRC) bandwidth reserved for vehicle communications.

In aspects described herein, UE 104 can include a modem 140 for communicating with other UEs and/or base stations in a wireless network. UE 104 can also include a communicating component 142 for managing coexistence of multiple RAT components for transmitting and/or receiving communications. For example, communicating component 142 can determine whether to transmit and/or receive communications of one RAT or another RAT in a given time period, which may be based on information regarding resource allocation for the RATs, priority to be given to one or the other RAT, and/or the like.

Figure 3A:
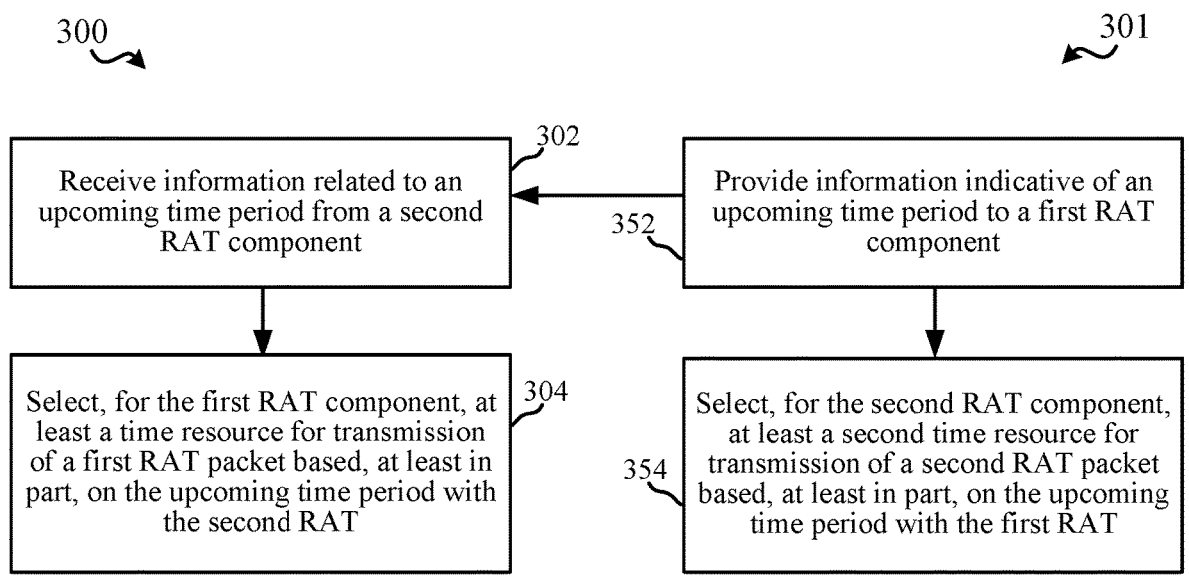
FIG. 3A illustrates flow charts of examples of methods for selecting resources for one radio access technology (RAT) transmission over another, in accordance with various aspects of the present disclosure.
Figure 3B:
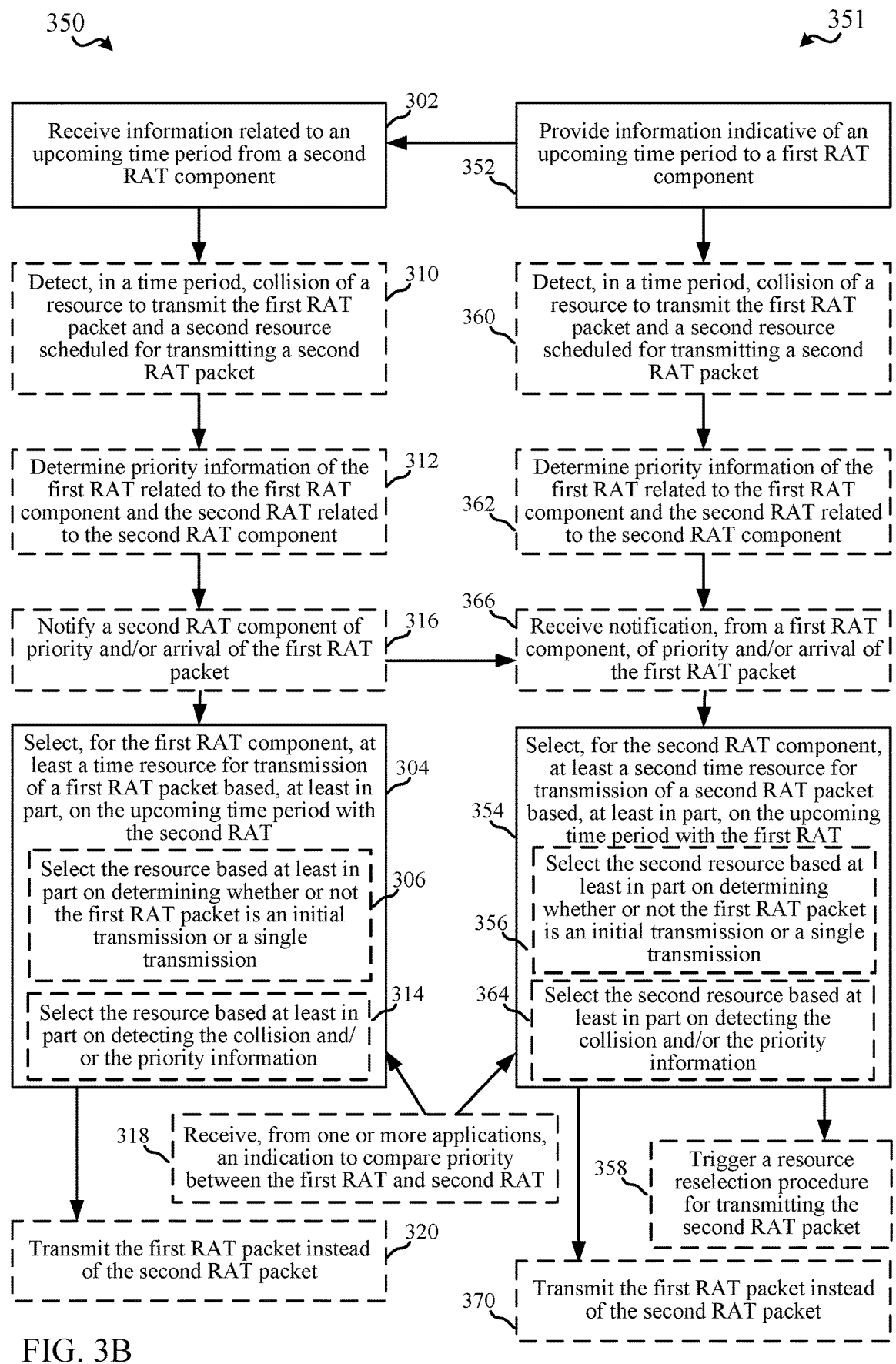
FIG. 3B illustrates flow charts of examples of methods with additional optional functionality for selecting resources for one RAT transmission over another, in accordance with various aspects of the present disclosure.
Figure 4:
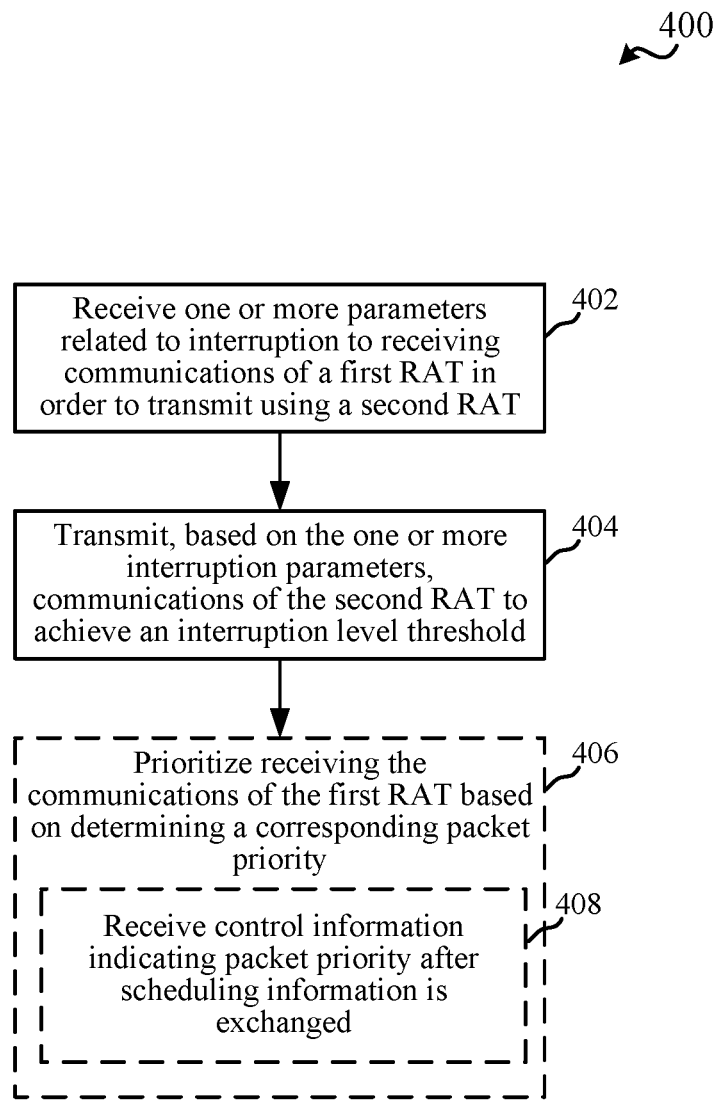
FIG. 4 is a flow chart illustrating an example of a method for selecting resources for transmitting using one RAT or receiving using another RAT, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 3 and 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
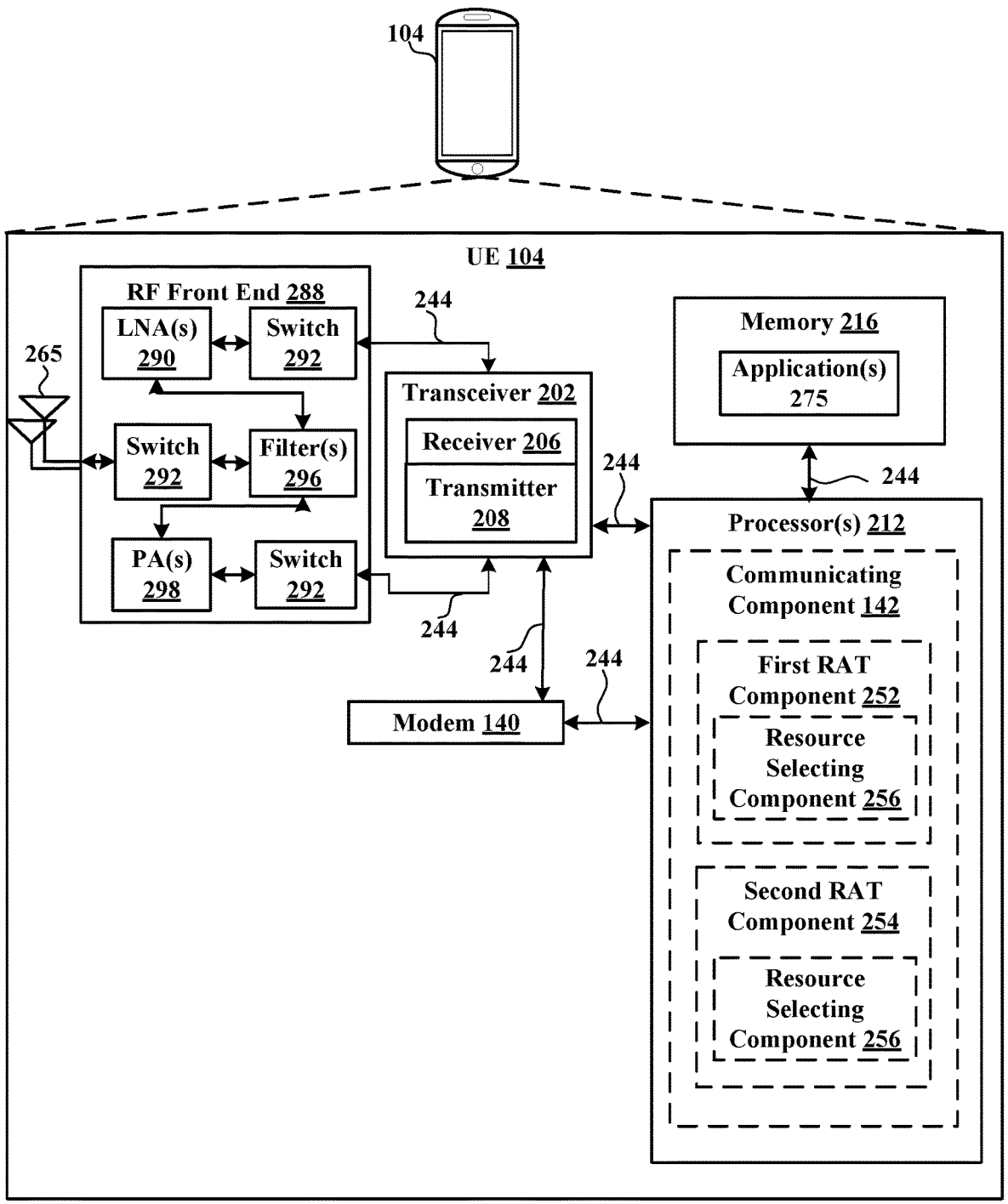
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140, a communicating component 142 for transmitting and/or retransmitting communications for multiple RATs in a wireless network, receiving communications for multiple RATs, etc., according to one or more of the functions described herein.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 142 can optionally include a first RAT component 252 for transmitting or receiving (e.g., via transceiver 202) communications based on a first RAT, a second RAT component 254 for transmitting and/or receiving (e.g., via transceiver 202) communications based on a second RAT. In addition, first RAT component 252 and/or second RAT component 254 may also include a resource selecting component 256 for selecting resources for communicating using either the first RAT or the second RAT (e.g., based on resource allocation information, priority information, etc., as described herein).

For example, the first RAT component 252 may include a collection of functions, applications, etc. that operate to process communications based on the first RAT, operate antennas 265, RF front end 288 components, a respective modem 140, etc. to encode/decode, modulation/demodulate, etc. communications of the first RAT, provide a network stack for generating, at various network layers, data units or other constructs to facilitate wirelessly communicating first RAT signals, and/or the like. Similarly, the second RAT component 254 may include a collection of functions, applications, etc. that operate to process communications based on the second RAT, operate antennas 265, RF front end 288 components, a respective modem 140, etc. to encode/decode, modulation/demodulate, etc. communications of the second RAT, provide a network stack for generating, at various network layers, data units or other constructs to facilitate wirelessly communicating second RAT signals, and/or the like.

In an aspect, the processor(s) 212 may correspond to one or more of the processors described in connection with the UE in FIG. 5. Similarly, the memory 216 may correspond to the memory described in connection with the UE in FIG. 5.

FIG. 3A illustrates a flow chart of examples of methods 300, 301 for managing transmissions of multiple RAT components at a UE. In an example, a UE 104 can perform the functions described in methods 300, 301 using one or more of the components described in FIGS. 1-2, such as communicating component 142 and/or its subcomponents. For example, many of the functions in method 300 may be performed in conjunction with first RAT component 252, while many of the functions in method 301 may be performed in conjunction with second RAT component 254. In one example, however, the same component may be operable to communicate using both RATs and may perform all of the functions of methods 300, 301 (e.g., where any functions that involve sending or receiving information can be performed internally by the same component).

In method 301, at Block 352, information indicative of an upcoming time period can be provided to a first RAT component. In an aspect, second RAT component 254, e.g., in conjunction with processor(s) 212, memory 216, transceiver 202, communicating component 142, etc., can provide information indicative of an upcoming time period (or other information from a second RAT component) to a first RAT component (e.g., first RAT component 252). In method 300, at Block 302, information related to an upcoming time period can be received from a second RAT component. In an aspect, first RAT component 252, e.g., in conjunction with processor(s) 212, memory 216, transceiver 202, communicating component 142, etc., can receive information related to an upcoming time period from the second component (e.g., second RAT component 254). In an example, "providing information," as used herein, may refer to or comprise sending information between components (e.g., different RAT network stacks implemented in the UE 104), sharing information between components via memory, etc. In an example, the information may correspond to whether the second RAT component 254 is scheduled to transmit a second RAT packet in the time period (e.g., a transmission time interval), and/or in one or more other time periods (e.g., TTIs). For example, the second RAT component 254 can be scheduled to transmit a second RAT packet in the time period based on receiving an uplink grant from a base station 102 (or another base station) that indicates, or otherwise or schedules or grants, resources over which the UE 104 is to transmit second RAT communications during the time period. In V2X, for example, second RAT component 254 can be scheduled (by a base station 102 or another UE) to transmit the second RAT packet in a specific time period over a sidelink channel, or can be provided with a resource pool from which to select resources for transmitting the second RAT packet.

Providing information related to the upcoming time period over which the second RAT component 254 is scheduled to transmit can allow the first RAT component 252 to detect a possible collision where the first RAT component 252 is also scheduled to transmit a first RAT packet in the time period(s). Similarly, for example, the first RAT component 252 can be scheduled to transmit a first RAT packet in the time period based on receiving an uplink grant from a base station 102 (or another base station) that indicates, or otherwise or schedules or grants, resources over which the UE 104 is to transmit first RAT communications during the time period. For example, this can be from the same or different base station that transmits the uplink grant for the second RAT communications. In V2X, for example, first RAT component 252 can be scheduled (by a base station 102 or another UE) to transmit the first RAT packet in a specific time period over a sidelink channel, or can be provided with a resource pool from which to select resources for transmitting the first RAT packet. In any case, this detected collision may trigger a mechanism in the UE 104 (e.g., in the first RAT component 252 or second RAT component 254, as described herein) to avoid the collision in some examples described herein. In this regard, for example, scheduling of resources, and/or collision avoidance, for first and/or second RAT communications can be done on a per TTI basis, and/or can be done ahead of time or instantaneously (e.g., where the inter stack information exchange delay is not sufficient to communicate scheduling decision of one RAT to the other RAT).

In one example, the first RAT can be LTE and the second RAT can be NR, and both RATs may correspond to transmitting sidelink communications over respective sidelink channels. For example, the UE 104 may not be able to (or may not desire to) transmit over both sidelink channels at the same time due to power limitations of simultaneously using transmission resources, possible interference caused by the transmissions to one another and/or other communications, etc. Thus, as described further herein, resource selecting component 256 can select a resource for transmitting first RAT or second RAT packets (e.g., one of the first RAT packet(s) or the second RAT packet(s)) to mitigate collisions among the different RAT transmissions.

In method 300, at Block 304, at least a time resource for transmission of a first RAT packet can be selected, for the first RAT component, based at least in part on the upcoming time period with the second RAT. In an aspect, resource selecting component 256, e.g., in conjunction with processor(s) 212, memory 216, transceiver 202, communicating component 142, first RAT component 252, etc., can select, for the first RAT component (e.g., first RAT component 252), at least a time resource for transmission of a first RAT packet based, at least in part, on the upcoming time period (e.g., one or more symbols, slots, subframes, etc., which can define a TTI) with the second RAT. For example, as described herein, resource selecting component 256 can select at least the time resource to minimize collision with communications of the second RAT (e.g., where the transmission of the first RAT may overlap with the communications of the second RAT in time and/or in frequency). In one example, resource selecting component 256 may always select the resource for communications of the first RAT, regardless of whether the second RAT is also scheduled to transmit over the resource in the time period, to prioritize the first RAT over the second RAT. In other examples, as described further herein, resource selecting component 256 can select the resource based on various information, such as determining whether the first RAT packet is an initial transmission over SPS scheduled resources or a single transmission over a single grant, detecting a collision between scheduled resources for the RATs, determining priority information for selecting the resource for one RAT over the other RAT, etc. In an example, the resource can be selected based at least in part on determining whether or not the first RAT packet is an initial transmission or a single transmission, based on detecting collision and/or priority information, etc., as described further herein.

Similarly, in method 301, at Block 354 for example, at least a second time resource for transmission of a second RAT packet can be selected, for the second RAT component, based at least in part on the upcoming time period with the first RAT. In an aspect, resource selecting component 256, e.g., in conjunction with processor(s) 212, memory 216, transceiver 202, communicating component 142, second RAT component 254, etc., can select, for the second RAT component (e.g., second RAT component 254), at least a second time resource for transmission of a second RAT packet based, at least in part, on the upcoming time period (e.g., one or more symbols, slots, subframes, etc., which can define a TTI) with the first RAT. For example, as described herein, resource selecting component 256 can select at least the second time resource to minimize collision with communications of the first RAT (e.g., where the transmission of the second RAT may overlap with the communications of the first RAT in time and/or in frequency). In one example, resource selecting component 256 may always select the resource for communications of the second RAT, regardless of whether the first RAT is also scheduled to transmit over the resource in the time period, to prioritize the second RAT over the first RAT. In other examples, as described further herein, resource selecting component 256 can select the resource based on various information, such as determining whether the first RAT packet is an initial transmission over SPS scheduled resources or a single transmission over a single grant, detecting a collision between scheduled resources for the RATs, determining priority information for selecting the resource for one RAT over the other RAT, etc. In an example, the second resource can be selected based at least in part on determining whether or not the first RAT packet is an initial transmission or a single transmission, based on detecting collision and/or priority information, etc., as described further herein.

FIG. 3B illustrates a flow chart of examples of methods 350, 351 with additional optional functionality for managing transmissions of multiple RAT components at a UE. In an example, a UE 104 can perform the functions described in methods 350, 351 using one or more of the components described in FIGS. 1-2, such as communicating component 142 and/or its subcomponents. For example, many of the functions in method 350 may be performed in conjunction with first RAT component 252, while many of the functions in method 351 may be performed in conjunction with second RAT component 254. In one example, however, the same component may be operable to communicate using both RATs and may perform all of the functions of methods 350, 351 (e.g., where any functions that involve sending or receiving information can be performed internally by the same component).

In method 351, at Block 352, information indicative of an upcoming time period can be provided to a first RAT component. In an aspect, second RAT component 254, e.g., in conjunction with processor(s) 212, memory 216, transceiver 202, communicating component 142, etc., can provide information indicative of an upcoming time period to a first RAT component (e.g., first RAT component 252), as described in reference to Block 352 in FIG. 3A. In method 350, at Block 302, information related to an upcoming time period can be received from a second RAT component. In an aspect, first RAT component 252, e.g., in conjunction with processor(s) 212, memory 216, transceiver 202, communicating component 142, etc., can receive information related to an upcoming time period from the second component (e.g., second RAT component 254)), as described in reference to Block 302 in FIG. 3A.

In method 350, at Block 304 (e.g., where optional Blocks 310, 312, 316 may or may not be performed, as described further herein), at least a time resource for transmission of a first RAT packet can be selected, for the first RAT component, based at least in part on the upcoming time period with the second RAT. In an aspect, resource selecting component 256, e.g., in conjunction with processor(s) 212, memory 216, transceiver 202, communicating component 142, first RAT component 252, etc., can select, for the first RAT component (e.g., first RAT component 252), at least a time resource for transmission of a first RAT packet based, at least in part, on the upcoming time period (e.g., one or more symbols, slots, subframes, etc., which can define a TTI) with the second RAT), as described in reference to Block 304 in FIG. 3A.

In an example, in selecting the resource at Block 304, optionally at Block 306, the resource (e.g., at least the time resource) can be selected based at least in part on determining whether or not the first RAT packet is an initial transmission or a single transmission. In an aspect, resource selecting component 256, e.g., in conjunction with processor(s) 212, memory 216, transceiver 202, communicating component 142, first RAT component 252, etc. can select the resource based at least in part on determining whether or not the first RAT packet is an initial transmission (e.g., in SPS scheduled resources) or a single transmission (in a single resource grant). In this case, for example, resource selecting component 256 may select the resource differently than where the first RAT packet is a subsequent transmission (e.g., in SPS scheduled resources), e.g., as information related to scheduling second RAT packets may be known at that point (after receiving, or otherwise based on, the first transmission).

In one specific example, where the first RAT component 252 communicates using LTE for V2X communications and the second RAT component 254 communicates using NR for V2X communications, where resource selecting component 256 determines that the first RAT packet is an initial transmission (in SPS scheduled resources) or a first transmission, resource selecting component 256 can select the resource for the first RAT packet (e.g., LTE) to prioritize over the second RAT (e.g., NR). In this example, for initial transmissions and single transmissions, information regarding LTE transmission may not be available in time to reschedule the first RAT packet or otherwise yield to second RAT communications. For example, resource selecting component 256 may select a resource for the initial LTE transmission that is early (e.g., less than a current time T+4 ms) and/or may otherwise collide with NR. For example, such a collision may be based on an information exchange delay between LTE and NR (e.g., between the first RAT component 252 and the second RAT component 254), such that exchange of information does not have time to occur (e.g., due to the delay may take more than 4 ms). In an example, in selecting the resource for transmitting the first RAT packet, resource selecting component 256 can cause second RAT component 254 to not transmit a colliding packet (e.g., a packet scheduled for transmission in the TTI) during the same time period as used to transmit the first RAT packet.

Similarly, in method 351, at Block 354 (e.g., where optional Blocks 360, 362, 366 may or may not be performed, as described further herein) for example, at least a second time resource for transmission of a second RAT packet can be selected, for the second RAT component, based at least in part on the upcoming time period with the first RAT. In an aspect, resource selecting component 256, e.g., in conjunction with processor(s) 212, memory 216, transceiver 202, communicating component 142, second RAT component 254, etc., can select, for the second RAT component (e.g., second RAT component 254), at least a second time resource for transmission of a second RAT packet, based at least in part, on the upcoming time period (e.g., one or more symbols, slots, subframes, etc., which can define a TTI) with the first RAT), as described in reference to Block 354 in FIG. 3A.

In an example, in selecting the resource at Block 354, optionally at Block 356, the second resource (e.g., at least the second time resource) can be selected based at least in part on determining whether or not the first RAT packet is an initial transmission or a single transmission. In an aspect, resource selecting component 256, e.g., in conjunction with processor(s) 212, memory 216, transceiver 202, communicating component 142, second RAT component 254, etc. can select the second resource based at least in part on determining whether or not the first RAT packet is an initial transmission (e.g., in SPS scheduled resources) or a single transmission (in a single resource grant). In this case, for example, resource selecting component 256 may select the resource differently than where the first RAT packet is a subsequent transmission (e.g., in SPS scheduled resources), e.g., as information related to scheduling second RAT packets may be known at that point (after receiving, or otherwise based on, the first transmission).

In one specific example, where the first RAT component 252 communicates using LTE for V2X communications and the second RAT component 254 communicates using NR for V2X communications, where resource selecting component 256 determines that the first RAT packet is an initial transmission (in SPS scheduled resources) or a first transmission, resource selecting component 256 can select the second resource for the second RAT packet (e.g., NR) to prioritize the first RAT (e.g., LTE) over the second RAT (NR). In this example, for initial transmissions and single transmissions, information regarding LTE transmission may not be available in time to reschedule the first RAT packet or otherwise yield to second RAT communications. In an example, in selecting the resource for transmitting the first RAT packet, resource selecting component 256 can cause second RAT component 254 to not transmit a colliding packet (e.g., a packet scheduled for transmission in the TTI), as described. For example, NR may choose resource for the initial transmission, and since this decision is instantaneous, if NR decides not to avoid known LTE resources, LTE may not know of the decision. In another example, NR may choose resource for retransmission of a packet. Even though the resource may be in the future, the time interval to the next reservation may be small (e.g. due to stringent delay). If this interval is smaller than the inter stack information exchange delay and the chosen resource happens to collide in time with a resource chosen by LTE, then again LTE may not know about a potential collision. In another example, NR may choose resource for retransmission of a packet. The chosen resource may collide in time with a resource chosen by LTE, but the time interval to such resource may be larger than the inter stack (e.g., between LTE and NR stack) information exchange delay, then the information about NR resource and priority level may be known at LTE in time. Thus, in some cases, a packet may be dropped.

For example, LTE may drop a reserved transmission in a SPS process. In LTE (e.g., defined in the LTE technical specifications), the next transmission in the same SPS process may not be protected by downlink control indicator (DCI) decoding exclusion since the previous transmission, which may be supposed to reserve the resource for this transmission, is dropped. In another example, NR may drop a reserved transmission. If NR (e.g., the second RAT component 254) does not attempt another transmission of the same packet, quality-of-service (QoS) for such packet may not be guaranteed. If NR (e.g., the second RAT component 254) still attempts another transmission, such transmission may not be protected by reservation and have increased chance of colliding with another transmission. Thus, in an example, as described herein, a limit allowance on the amount of missed reservations that a UE can make in order to address the in device coexistence Tx/Tx collision issue can be defined. In another example, as described herein, for the case when packet priority and resource selection decision may be known ahead of time (e.g. before the inter stack information exchange delay), information about priority of NR packet and LTE packet can be used to resolve the Tx/Tx collision (e.g. decide if one transmission to be dropped, and which one).

In an example, in method 351, optionally at Block 358, a resource reselection procedure for transmitting the second RAT packet can be triggered. In an aspect, second RAT component 254, e.g., in conjunction with processor(s) 212, memory 216, transceiver 202, communicating component 142, etc. can trigger the resource reselection procedure for transmitting the second RAT packet, which can be based on not transmitting the colliding packet (e.g., based on being instructed by the resource selecting component 256 to not transmit the colliding packet or to otherwise request alternative resources for transmitting the colliding packet). In this example, second RAT component 254 can request additional resources (e.g., from a base station 102) or may otherwise select available resources for transmitting the second RAT packet in a subsequent TTI.

In another example, in method 350, optionally at Block 310, collision of the resource (e.g., at least the time resource) to transmit the first RAT packet and a second resource scheduled for transmitting a second RAT packet can be detected in a period of time. Similarly, in method 351, optionally at Block 360, collision of the resource to transmit the first RAT packet and a second resource scheduled for transmitting a second RAT packet can be detected in a period of time. In an aspect, resource selecting component 256, e.g., in conjunction with processor(s) 212, memory 216, transceiver 202, communicating component 142, first RAT component 252, second RAT component 254, etc., can detect, in the time period (e.g., one or more symbols, slots, subframes, etc., which can define a TTI), collision of the resource to transmit the first RAT packet and a second resource scheduled for transmitting a second RAT packet (e.g., based on received information before the packet(s) are scheduled to be transmitted). In an example, resource selecting component 256 may detect the collision based on information from the first RAT component 252 regarding resources scheduled/selected for transmitting and information from the second RAT component 254 regarding resources scheduled/selected for transmitting. For example, the first RAT component 252 and/or second RAT component 254 can be configured with resources for transmitting V2X communications (e.g., SPS resources for multiple resource grants or single one-time resource grants for transmitting over a sidelink channel). Based on the scheduling information, resource selecting component 256 can determine one or more time periods (e.g., one or more symbols, slots, subframes, etc., which can define one or more TTIs) over which transmissions are scheduled for the first RAT and the second RAT. In one example, in this regard, the first RAT and second RAT may be substantially synchronized in time and/or subframe/slot alignment, which can allow the resource selecting component 256 to determine the possible collisions or overlap in resource scheduling among the RATs.

In this example, in method 350, optionally at Block 312, priority information of the first RAT related to the first RAT component and the second RAT related to the second RAT component can be determined. Similarly, in method 351, optionally at Block 362, priority information of the first RAT related to the first RAT component and the second RAT related to the second RAT component can be determined. In an aspect, resource selecting component 256, e.g., in conjunction with processor(s) 212, memory 216, transceiver 202, communicating component 142, first RAT component 252, second RAT component 254, etc., can determine the priority information of the first RAT related to the first RAT component 252 and/or of the second RAT related to the second RAT component 254.

In this example, in selecting the resource at Block 304, optionally at Block 314, the resource (e.g., at least the time resource) can be selected based at least in part on detecting the collision and/or the priority information. Similarly, in selecting the resource at Block 354, optionally at Block 364, the second resource can be selected based at least in part on detecting the collision and/or the priority information. In an aspect, resource selecting component 256, e.g., in conjunction with processor(s) 212, memory 216, transceiver 202, communicating component 142, first RAT component 252, second RAT component 254, etc., can select the resource and/or the second resource based at least in part on detecting the collision and/or the priority information. For example, resource selecting component 256 (e.g., of the first RAT component 252) can select the resource for the first RAT packet instead of the second RAT packet (and/or vice versa) based on various information and/or considerations described herein. For example, resource selecting component 256 may select the resource for the first RAT packet where second RAT communications are not scheduled in the time period. In this regard, for example, resource selecting component 256 may avoid selecting resources for first RAT communications in time periods (e.g., TTIs) where second RAT communications are scheduled for transmission (e.g., or resources for second RAT transmissions are otherwise reserved). In another example, resource selecting component 256 may avoid selecting resources for first RAT communications in time periods (e.g., TTIs) occurring before receiving scheduling information for second RAT communications (e.g., before receiving information that may be sent at Block 302 from the second RAT component 254).

In addition, in this example in method 350, optionally at Block 316, a second RAT component can be notified of priority and/or arrival of the first RAT packet. In an aspect, first RAT component 252, e.g., in conjunction with processor(s) 212, memory 216, transceiver 202, communicating component 142, etc., can notify the second RAT component 254 of the priority and/or arrival of the first RAT packet. In this example in method 351, optionally at Block 366, a notification of priority and/or arrival of the first RAT packet can be received from a first RAT component. In an aspect, second RAT component 254, e.g., in conjunction with processor(s) 212, memory 216, transceiver 202, communicating component 142, etc., can receive the notification, from the first RAT component 252, of the priority and/or arrival of the first RAT packet. In this example, second RAT component 254 and/or resource selecting component 256 can accordingly consider the existence of the first RAT packet waiting for transmission in scheduling second RAT resources, or otherwise selecting the second resource (e.g., at Block 354). In the above examples, the first RAT may be LTE and the second RAT may be NR, such that in selecting resources for transmitting LTE packets, for example, LTE (e.g., a LTE component) may not consider TTIs with known NR reservation for resource selection, LTE may not consider TTI that is too soon (sooner than information exchange delay to NR) for resource selection, and/or LTE may send a notification to NR as soon as, or otherwise based on, packet arrival to limit the vulnerable window where NR is not aware of a potential LTE transmission.

For subsequent transmissions (e.g., in SPS scheduled transmission), priority information may be more readily used in determining whether to select resources for first RAT or second RAT transmissions. For example, for each collision detected at Block 310 and/or 360, the resource or second resource can be selected for transmitting one RAT packet or the other at Block 314 and/or 364 based on the detected collision and priority information. In an example, the priority information may be included in the initial transmission, and this may be determined based on the initial transmission and/or informed to the other RAT based on packet arrival, as described in Blocks 316 and 366. This priority information can be used in selecting the resource in the time period for first RAT packet transmission at Block 314 (e.g., where the priority information is at a level to cause prioritization over a colliding second RAT packet), and/or the second resource for second RAT packet transmission at Block 364. In the specific example above, where the first RAT is LTE, LTE priority may be determined based on the initial transmission and/or as informed to NR (e.g., to the NR component) based on packet arrival. Where the priority indicates that LTE is prioritized, resource selecting component 256 can select the resource for transmitting the LTE packet, or can select the resource for transmitting the NR packet otherwise.

In another example, where first RAT transmissions are prioritized, second RAT transmissions can be dropped. In a specific example, where the first RAT is NR and resource selecting component 256 selects the resource in the time period for transmitting a NR packet, second RAT component 254 can drop a colliding LTE transmission. For example, this may apply to NR retransmissions (e.g., hybrid automatic repeat/request (HARQ) retransmissions). In this example, for a NR transmission that is not a retransmission, first RAT component 252 can notify the second RAT component 254 (e.g., LTE) of packet arrival at the first RAT component 252 and/or can wait for an information exchange (e.g., of scheduling information) before selecting a resource for transmitting the NR transmission. In this regard, for example, first RAT component 252 can select the resource based on the scheduling information received from the second RAT component 254, as described above, at least for the NR transmission that is not a retransmission, but the LTE transmissions can be dropped for NR retransmissions. For example, dropping a second RAT transmission can include selecting a resource to transmit the first RAT packet instead of the second RAT packet (e.g., at Block 304), or dropping a first RAT transmission can include selecting a resource to transmit the second RAT packet instead of the first RAT packet (e.g., at Block 364).

In method 350, optionally at Block 318, an indication to compare priority between the first RAT and the second RAT can be received from one or more applications. In an aspect, resource selecting component 256, e.g., in conjunction with processor(s) 212, memory 216, transceiver 202, communicating component 142, etc., can receive, from the one or more applications (e.g., executing on UE 104 such to provide packets to the first RAT component 252 and/or second RAT component 254 for transmission), an indication to compare (or resolve) priority between the first RAT and the second RAT. In this regard, for example, resource selecting component 256 can further use this indication to select the resource at Block 304 and/or Block 354, and/or to determine the priority information for selecting the resource. For example, the one or more applications may indicate which RAT to prioritize, instances or parameters causing prioritization of one RAT over another, etc.

In method 350, optionally at Block 320, the first RAT packet can be transmitted instead of the second RAT packet, and in method 351, optionally at Block 370, the first RAT packet can be transmitted instead of the second RAT packet. In an aspect, first RAT component 252, e.g., in conjunction with processor(s) 212, memory 216, transceiver 202, communicating component 142, etc., can transmit the first RAT packet instead of second RAT component 254 transmitting the second RAT packet. As described, for example, second RAT component 254 can drop the second RAT packet and/or can request additional resource selection for transmitting the second RAT packet in a subsequent time period, etc.

FIG. 4 illustrates a flow chart of an example of a method 400 for managing transmissions and/or receptions of multiple RAT components at a UE. In an example, a UE 104 can perform the functions described in method 400 using one or more of the components described in FIGS. 1-2, such as communicating component 142 and/or its subcomponents.

In method 400, at Block 402, one or more parameters related to interruption to receiving communications of a first RAT in order to transmit using a second RAT can be received. In an aspect, resource selecting component 256, e.g., in conjunction with processor(s) 212, memory 216, transceiver 202, communicating component 142, etc., can receive one or more interruption parameters related to interruption to receiving communications of the first RAT in order to transmit using the second RAT. For example, resource selecting component 256 may receive the interruption parameter(s) as indicating an interruption time interval or a period of time (e.g., window length) over which to allow interruption of transmitting using the second RAT to receive communications of the first RAT. For example, the interruption time interval may be defined as a ratio of the window length (e.g., a slot, subframe, TTI or collection of TTIs, etc.) to the interruption time interval, a ratio of scheduled resources, and/or the like, which can represent a minimum (e.g., guaranteed) interruption time interval for receiving communications of the first RAT. In addition, for example, resource selecting component 256 can receive the one or more parameters from memory 216 (e.g., as stored according to a wireless communication technology specification, such as LTE, NR, etc.), from a base station (e.g., via radio resource control (RRC) signaling, dedicated control signaling, system information broadcast, and/or the like), etc.

In method 400, at Block 404, communications of the second RAT can be transmitted, based on the one or more interruption parameters, to achieve an interruption level threshold. In an aspect, second RAT component 254, e.g., in conjunction with processor(s) 212, memory 216, transceiver 202, communicating component 142, resource selecting component 256, etc., can transmit, based on the one or more interruption parameters, communications of the second RAT to achieve the interruption level threshold. In one example, this may be based on resources selected for second RAT transmission by resource selecting component 256. In this regard, for example, resource selecting component 256 can select resources for transmitting second RAT communications such to allow at least the interruption level (e.g., time) to the first RAT to potentially receive first RAT communications.

In one example, the transmitting RAT can be prioritized for the most part with defined interruption time for the receiving RAT. For example, LTE receive interruption time can be defined by the parameter(s) to occur per second, or any window of time, that may be based on a time division defined for LTE and/or NR or otherwise). In addition, in an example, the parameter(s) can define an interruption time for one or more (e.g., each) NR transmission priority levels, such that resource selecting component 256 can determine the interruption time based on the priority level of the NR transmissions. Resource selecting component 256 can manage NR transmissions to not exceed the interruption level, by ensuring that the first RAT component 252 is scheduled resources for first RAT communications based on the interruption level, and thus first RAT component 252 may receive first RAT communications at least during most of the time except for the interruption time defined over a larger period of time (e.g., in one or more TTIs over a second or other division of time). Additionally, in an example, per-priority interruption times can be configured by the network (e.g., by base station 102, e.g., via RRC signaling, dedicated control signaling to the UE 104, etc.).

In another example, the first (receiving) RAT can be NR and the transmitting (second) RAT can be LTE. In this example, resource selecting component 256 can determine to prioritize LTE transmissions in most cases, but can select resources scheduled for LTE transmissions to instead receive NR communications based on the interruption parameter(s), as described above. In another example, resource selecting component 256 can determine to always prioritize LTE transmissions over receiving NR communications. In some cases, it may be difficult to reliably determine NR priority (e.g., in transmissions that are not retransmissions and/or in retransmissions where the first non-retransmission is missed), and thus LTE can always be prioritized and/or the NR interruption times can be defined and used.

In method 400, optionally at Block 406, receiving the communications of the first RAT can be prioritized based on determining a corresponding packet priority. In an aspect, resource selecting component 256, e.g., in conjunction with processor(s) 212, memory 216, transceiver 202, communicating component 142, etc., can prioritize receiving the communications of the first RAT based on determining the corresponding packet priority. For example, resource selecting component 256 can cause the first RAT component 252 to receive communications of the first RAT (e.g., and/or cause the second RAT component 254 to refrain from transmitting communications of the second RAT) in one or more time periods based on determining the packet priority. In one example, resource selecting component 256 may know the priority of the receiving packet (e.g., in case of HARQ retransmission) and may accordingly prioritize receiving the packet (e.g., by refraining from transmitting second RAT communications in the time period and/or dropping the second RAT communications). In an example, resource selecting component 256 can refrain from transmitting the second RAT communications in the time period where a delay to allow information exchange between the first RAT component 252 and second RAT component 254 is adequate (e.g., greater than the inter stack information exchange delay).

In this example, in method 400, optionally at Block 408, control information can be received indicating the packet priority. In an aspect, resource selecting component 256, e.g., in conjunction with processor(s) 212, memory 216, transceiver 202, communicating component 142, etc., can receive control information indicating packet priority. In this example, the control information can be used in determining to prioritize receiving the first RAT packet over transmitting second RAT communications in the time period. For example, the control information may indicate scheduling (e.g., a selected resource or set of resources in time and/or frequency) and/or priority information of the first RAT packet, and then may also send the scheduling and/or priority information to the second RAT component 254 if the scheduled receiving time interval is after the scheduling information is exchanged, so the second RAT component 254 may avoid transmitting to allow time for receiving the first RAT packet.

Figure 5:
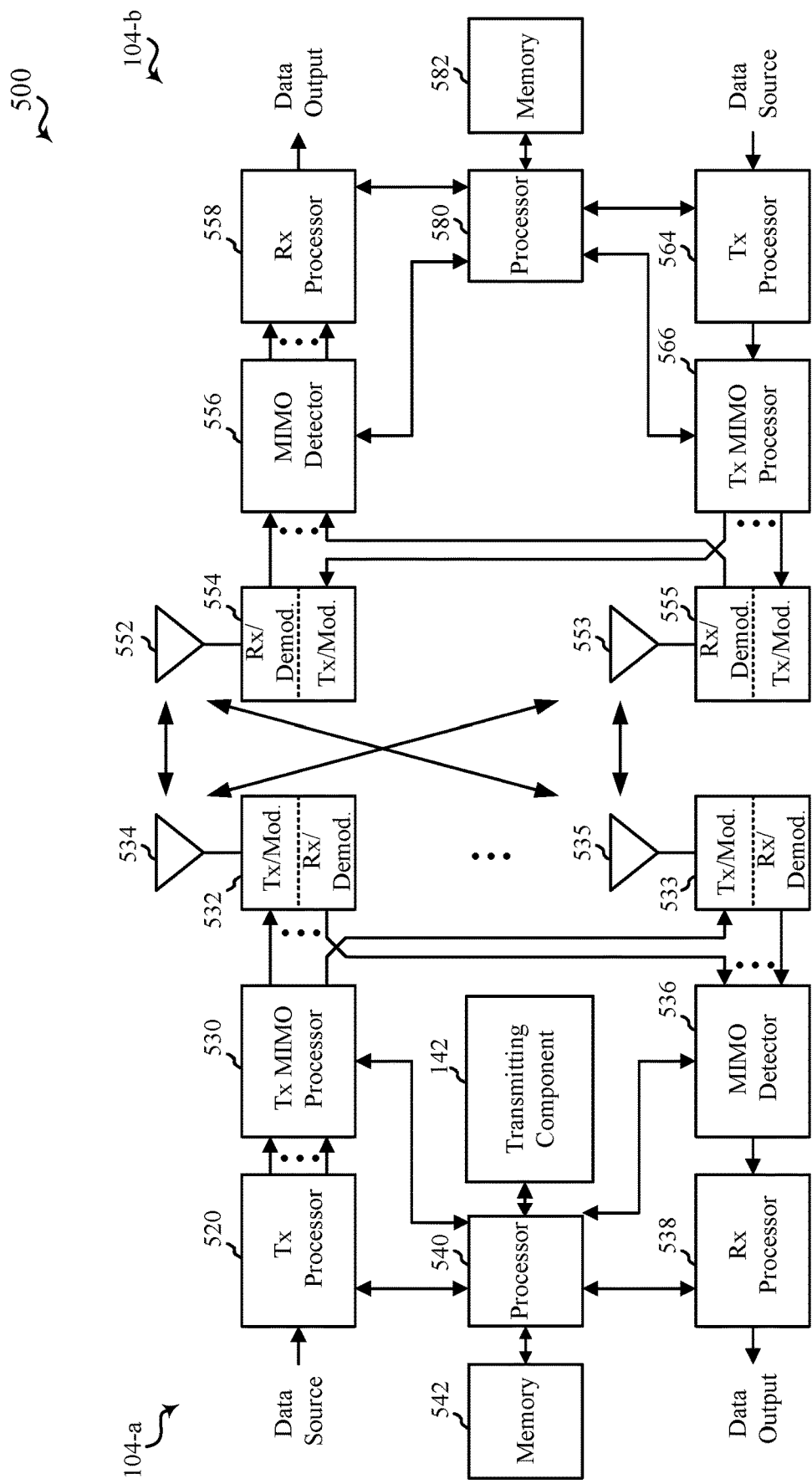
FIG. 5 is a block diagram illustrating an example of a MIMO communication system including a base station and a UE, in accordance with various aspects of the present disclosure.

FIG. 5 is a block diagram of a MIMO communication system 500 including UEs 104-a, 104-b. The MIMO communication system 500 may illustrate aspects of the wireless communication access network 100 described with reference to FIG. 1. The UE 104-a may be an example of aspects of the UE 104 described with reference to FIGS. 1-2. The UE 104-a may be equipped with antennas 534 and 535, and the UE 104-b may be equipped with antennas 552 and 553. In the MIMO communication system 500, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104-b may be an example of aspects of the UEs 104 described with reference to FIGS. 1-2. At the UE 104-b, the UE antennas 552 and 553 may receive the signals from the UE 104-a (e.g., over a sidelink) and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104-b to a data output, and provide decoded control information to a processor 580, or memory 582.

At the UE 104-b, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the UE 104-a in accordance with the communication parameters received from the UE 104-a. At the UE 104-a, the signals from the UE 104-b may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a communicating component 142 (see e.g., FIGS. 1 and 2).

The components of the UEs 104-a, 104-b may, individually or collectively, be implemented with one or more application specific integrated circuits (ASICs) adapted to perform some or all of the applicable functions in hardware. Each of the noted modules may be a means for performing one or more functions related to operation of the MIMO communication system 500. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 500.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising:
sending information related to an upcoming time period to a first radio access technology (RAT) component of a device from a second RAT component of the device; and
selecting, by the first RAT component, a resource to transmit a first RAT packet to minimize collision with the upcoming time period of the second RAT.

2. The method of example 1, further comprising:
detecting, in the upcoming time period, collision of the resource to transmit the first RAT packet and a second resource scheduled for transmitting a second RAT packet using the second RAT; and
determining priority information of the first RAT related to the first RAT component and the second RAT related to the second RAT component,
wherein selecting the resource to transmit the first RAT packet comprises selecting the resource in the upcoming time period based at least in part on based on detecting the collision and on the priority information.

3. The method of example 2, wherein the first RAT is long term evolution (LTE) and the second RAT is new radio (NR), wherein the first RAT packet is an initial transmission over semi-persistently scheduled resources or a single transmission over a single resource grant, wherein determining the priority information comprises determining to prioritize communications in LTE over NR, and further comprising transmitting the first RAT packet using LTE over the resource in the upcoming time period instead of the second RAT packet using NR.

4. The method of example 3, further comprising triggering, based on refraining from transmitting the second RAT packet in the upcoming time period, a resource reselection procedure to receive an indication of resources for transmitting the second RAT packet.

5. The method of any of examples 1 to 4, wherein the first RAT packet is an initial transmission over semi-persistently scheduled resources or a single transmission over a single resource grant, and wherein selecting the resource to transmit the first RAT packet is based at least in part on determining, based on second RAT scheduling information, that the resource is not overlapping with time intervals scheduled with communications of the second RAT.

6. The method of any of examples 1 to 5, wherein the first RAT packet is an initial transmission over semi-persistently scheduled resources or a single transmission over a single resource grant, and wherein selecting the resource to transmit the first RAT packet is based at least in part on determining that second RAT scheduling information regarding time intervals scheduled with communications of the second RAT has been received.

7. The method of any of examples 1 to 6, further comprising:
notifying the second RAT component of an arrival and a priority of the first RAT packet for transmitting using the first RAT; and
determining to prioritize communications in of the second RAT over the RAT based at least in part on the arrival of the first RAT packet for transmitting using the first RAT.

8. The method of any of examples 1 to 7, wherein the first RAT packet is a transmission subsequent to an initial transmission over semi-persistently scheduled resources, and further comprising:
detecting, in the upcoming time period, collision of the resource to transmit the first RAT packet and a second resource scheduled for transmitting a second RAT packet using the second RAT; and
determining, based at least in part on determining an initial resource over which the initial transmission of the first RAT occurs, priority information of the first RAT related to the first RAT component and the second RAT related to the second RAT component,
wherein selecting the resource to transmit the first RAT packet comprises selecting the resource in the upcoming time period based at least in part on based on detecting the collision and on the priority information.

9. The method of example 8, further comprising notifying the second RAT component of at least one of an arrival or a priority of the first RAT packet for transmitting using the first RAT, wherein selecting the resource to transmit the first RAT packet is based at least in part on the arrival of the first RAT packet for transmitting using the first RAT.

10. The method of any of examples 8 or 9, wherein the first RAT is long term evolution (LTE) and the second RAT is new radio (NR), and wherein selecting the resource comprises selecting the resource to transmit the first RAT packet in the upcoming time period using LTE and dropping the second RAT packet using NR.

11. The method of any of examples 8 to 10, wherein the first RAT is new radio (NR) and the second RAT is long term evolution (LTE), and wherein selecting the resource comprises selecting the resource to transmit the first RAT packet in the upcoming time period using NR and dropping the second RAT packet using LTE.

12. The method of any of examples 1 to 11, further comprising receiving, from one or more applications, an indication to compare priority between the first RAT and second RAT from one or more applications, wherein selecting the resource is based at least in part on the indication.

13. A method of wireless communication, comprising:
receiving one or more interruption parameters related to receiving communications of a first radio access technology (RAT) using a first RAT component of a device over transmitting communications of a second RAT using a second RAT component of the device; and
transmitting, at the device and based on the one or more interruption parameters, communications of the second RAT using the second RAT component to achieve an interruption level threshold.

14. The method of example 13, wherein the one or more interruption parameters include the interruption level threshold and a window length, wherein transmitting the communications of the second RAT achieves interruption less than a ratio of the interruption level threshold to the window length.

15. The method of any of examples 13 or 14, wherein the first RAT is long term evolution (LTE) and the second RAT is new radio (NR), and wherein the one or more interruption parameters are based at least in part on determining a packet priority of the wireless communications of NR.

16. The method of any of examples 13 to 15, wherein the first RAT is new radio (NR) and the second RAT is long term evolution (LTE).

17. The method of any of examples 13 to 16, further comprising prioritizing receiving the communications of the first RAT based on determining a corresponding packet priority, wherein prioritizing receiving the communications of the first RAT comprises dropping transmission of the communications of the second RAT.

18. The method of example 17, wherein determining the corresponding packet priority is based at least in part on:
receiving control information including a selected resource and priority information of the receiving packet by the first RAT; and
sending the selected resource and priority information to the second RAT component for determining whether to transmit communications of the second RAT in a time period.

19. An apparatus for wireless communication, comprising:
a transceiver;
a memory configured to store instructions; and
one or more processors communicatively coupled with the transceiver and the memory, wherein the one or more processors are configured to:
send information related to an upcoming time period to a first radio access technology (RAT) component of a device from a second RAT component of the device; and
select, by the first RAT component, a resource to transmit a first RAT packet to minimize collision with the upcoming time period of the second RAT.

20. The apparatus of example 19, wherein the one or more processors are further configured to:
detect, in the upcoming time period, collision of the resource to transmit the first RAT packet and a second resource selected for transmitting a second RAT packet using the second RAT; and
determine priority information of the first RAT related to the first RAT component and the second RAT related to the second RAT component,
wherein the one or more processors are configured to select the resource to transmit the first RAT packet at least in part by selecting the resource in the upcoming time period based at least in part on based on detecting the collision and on the priority information.

21. The apparatus of example 20, wherein the first RAT is long term evolution (LTE) and the second RAT is new radio (NR), wherein the one or more processors are further configured to determine the priority information at least in part by determining to prioritize communications in LTE over NR, and wherein the one or more processors are further configured to transmit the first RAT packet using LTE over the resource in the upcoming time period instead of the second RAT packet using NR.

22. The apparatus of example 21, wherein the one or more processors are further configured to trigger, based on refraining from transmitting the second RAT packet in the upcoming time period, a resource reselection procedure for transmitting the second RAT packet.

23. The apparatus of any of examples 19 to 22, wherein the first RAT packet is an initial transmission over semi-persistently scheduled resources or a single transmission over a single resource grant, and wherein the one or more processors are configured to select the resource to transmit the first RAT packet based at least in part on determining, based on second RAT scheduling information, that the resource is not overlapping with time intervals scheduled with communications of the second RAT.

24. The apparatus of any of examples 19 to 23, wherein the first RAT packet is an initial transmission over semi-persistently scheduled resources or a single transmission over a single resource grant, and wherein the one or more processors are configured to select the resource to transmit the first RAT packet based at least in part on determining that second RAT scheduling information regarding time intervals scheduled with communications of the second RAT has been received.

25. The apparatus of any of examples 19 to 24, wherein the one or more processors are further configured to:
notify the second RAT component of an arrival and a priority of the first RAT packet for transmitting using the first RAT; and
determine to prioritize communications in of the second RAT over the RAT based at least in part on the arrival of the first RAT packet for transmitting using the first RAT.

26. The method of any of examples 19 to 25, wherein the first RAT packet is a transmission subsequent to an initial transmission over semi-persistently scheduled resources, and wherein the one or more processors are further configured to:
detect, in the upcoming time period, collision of the resource to transmit the first RAT packet and a second resource scheduled for transmitting a second RAT packet using the second RAT; and
determine, based at least in part on determining an initial resource over which the initial transmission of the first RAT occurs, priority information of the first RAT related to the first RAT component and the second RAT related to the second RAT component,
wherein the one or more processors are configured to select the resource to transmit the first RAT packet in the upcoming time period based at least in part on based on detecting the collision and on the priority information.

27. The apparatus of example 26, wherein the one or more processors are further configured to notify the second RAT component of at least one of an arrival or a priority of the first RAT packet for transmitting using the first RAT, wherein the one or more processors are configured to select the resource to transmit the first RAT packet based at least in part on the arrival of the first RAT packet for transmitting using the first RAT.

28. An apparatus for wireless communication, comprising:
a transceiver;
a memory configured to store instructions; and
one or more processors communicatively coupled with the transceiver and the memory, wherein the one or more processors are configured to:
receive one or more interruption parameters related to receiving communications of a first radio access technology (RAT) using a first RAT component of a device over transmitting communications of a second RAT using a second RAT component of the device; and
transmit, at the device and based on the one or more interruption parameters, communications of the second RAT using the second RAT component to achieve an interruption level threshold.

29. The apparatus of example 28, wherein the one or more interruption parameters include the interruption level threshold and a window length, wherein the one or more processors are configured to transmit the communications of the second RAT to achieve interruption less than a ratio of the interruption level threshold to the window length.

30. The apparatus of any of examples 28 or 29, wherein the first RAT is long term evolution (LTE) and the second RAT is new radio (NR), and wherein the one or more interruption parameters are based at least in part on determining a packet priority of the wireless communications of NR.

What is claimed is:

1. A method of wireless communication, comprising:
sending information indicative of an upcoming time period of a second radio access technology (RAT) component of a second RAT of a device to a first RAT component of a first RAT of the device; and
selecting, by the first RAT component, at least a time resource for transmission of a first RAT packet based, at least in part, on the upcoming time period of the second RAT component, wherein selecting at least the time resource includes selecting, where the first RAT packet corresponds to an initial transmission over at least the time resource of a semi-persistent scheduling (SPS) grant that overlaps the upcoming time period of the second RAT component, at least the time resource for the initial transmission instead of for transmission of a second RAT packet of the second RAT component.

2. The method of claim 1, further comprising:
detecting, in the upcoming time period, collision of at least the time resource for transmission of the first RAT packet and a second time resource scheduled for transmitting the second RAT packet using the second RAT component; and
determining priority information of the first RAT related to the first RAT component and the second RAT related to the second RAT component,
wherein selecting at least the time resource for transmission of the first RAT packet comprises selecting at least the time resource in the upcoming time period based at least in part on based on detecting the collision and on the priority information.

3. The method of claim 2, wherein the first RAT is long term evolution (LTE) and the second RAT is new radio (NR), and further comprising transmitting the first RAT packet using LTE over at least the time resource in the upcoming time period instead of the second RAT packet using NR.

4. The method of claim 3, further comprising triggering, based on refraining from transmitting the second RAT packet in the upcoming time period, a resource reselection procedure to receive an indication of resources for transmitting the second RAT packet.

5. The method of claim 1, wherein the first RAT packet is the initial transmission or a single transmission over a single resource grant, and wherein selecting at least the time resource for transmission of the first RAT packet is based at least in part on determining that second RAT scheduling information regarding time intervals scheduled with communications of the second RAT has been received.

6. The method of claim 1, further comprising:
notifying the second RAT component of an arrival and a priority of the first RAT packet for transmitting using the first RAT; and
determining to prioritize communications of the second RAT over the first RAT based at least in part on the arrival of the first RAT packet for transmitting using the first RAT.

7. The method of claim 1, further comprising:
detecting, in a next upcoming time period, a next collision of a next time resource for transmitting a subsequent transmission of the first RAT packet and a second resource scheduled for transmitting a second RAT packet using the second RAT;
determining, based at least in part on determining an initial resource over which the initial transmission of the first RAT occurs, next priority information of the first RAT related to the first RAT component and the second RAT related to the second RAT component; and
selecting the next time resource for the subsequent transmission of the first RAT packet in the next upcoming time period based at least in part on based on detecting the next collision and on the next priority information.

8. The method of claim 7, further comprising notifying the second RAT component of at least one of an arrival or a priority of the first RAT packet for transmitting using the first RAT, wherein selecting the next time resource for the subsequent transmission of the first RAT packet is based at least in part on the arrival of the first RAT packet for transmitting using the first RAT.

9. The method of claim 7, wherein the first RAT is long term evolution (LTE) and the second RAT is new radio (NR), and wherein selecting the next time resource comprises selecting the next time resource for the subsequent transmission of the first RAT packet in the next upcoming time period using LTE and dropping the second RAT packet using NR.

10. The method of claim 7, wherein the first RAT is new radio (NR) and the second RAT is long term evolution (LTE), and wherein selecting the next time resource comprises selecting the next time resource for the subsequent transmission of the first RAT packet in the next upcoming time period using NR and dropping the second RAT packet using LTE.

11. The method of claim 1, further comprising receiving, from one or more applications, an indication to compare priority between the first RAT and second RAT from one or more applications, wherein selecting at least the time resource is based at least in part on the indication.

12. An apparatus for wireless communication, comprising:
a transceiver;
a memory configured to store instructions; and
one or more processors communicatively coupled with the transceiver and the memory, wherein the one or more processors are configured to:
provide information indicative of an upcoming time period of a second radio access technology (RAT) component of a second RAT of a device to a first RAT component of a first RAT of the device; and
select, by the first RAT component, at least a time resource for transmission of a first RAT packet based, at least in part, on the upcoming time period of the second RAT component, wherein selecting at least the time resource includes selecting, where the first RAT packet corresponds to an initial transmission over at least the time resource of a semi-persistent scheduling (SPS) grant that overlaps the upcoming time period of the second RAT component, at least the time resource for the initial transmission instead of for transmission of a second RAT packet of the second RAT component.

13. The apparatus of claim 12, wherein the one or more processors are further configured to:
detect, in the upcoming time period, collision of at least the time resource for transmission of the first RAT packet and a second resource selected for transmitting the a-second RAT packet using the second RAT component; and
determine priority information of the first RAT related to the first RAT component and the second RAT related to the second RAT component,
wherein the one or more processors are configured to select at least the time resource for transmission of the first RAT packet at least in part by selecting at least the time resource in the upcoming time period based at least in part on based on detecting the collision and on the priority information.

14. The apparatus of claim 13, wherein the first RAT is long term evolution (LTE) and the second RAT is new radio (NR), and wherein the one or more processors are further configured to transmit the first RAT packet using LTE over at least the time resource in the upcoming time period instead of the second RAT packet using NR.

15. The apparatus of claim 14, wherein the one or more processors are further configured to trigger, based on refraining from transmitting the second RAT packet in the upcoming time period, a resource reselection procedure for transmitting the second RAT packet.

16. The apparatus of claim 12, wherein the first RAT packet is the initial transmission or a single transmission over a single resource grant, and wherein the one or more processors are configured to select at least the time resource for transmission of the first RAT packet based at least in part on determining that second RAT scheduling information regarding time intervals scheduled with communications of the second RAT has been received.

17. The apparatus of claim 12, wherein the one or more processors are further configured to:
notify the second RAT component of an arrival and a priority of the first RAT packet for transmitting using the first RAT; and
determine to prioritize communications of the second RAT over the first RAT based at least in part on the arrival of the first RAT packet for transmitting using the first RAT.

18. The apparatus of claim 12, wherein the one or more processors are further configured to:
detect, in a next upcoming time period, a next collision of a next time resource for transmitting a subsequent transmission of the first RAT packet and a second resource scheduled for transmitting a second RAT packet using the second RAT;
determine, based at least in part on determining an initial resource over which the initial transmission of the first RAT occurs, next priority information of the first RAT related to the first RAT component and the second RAT related to the second RAT component; and
select the next time resource for the subsequent transmission of the first RAT packet in the next upcoming time period based at least in part on based on detecting the next collision and on the next priority information.

19. The apparatus of claim 18, wherein the one or more processors are further configured to notify the second RAT component of at least one of an arrival or a priority of the first RAT packet for transmitting using the first RAT, wherein the one or more processors are configured to select the next time resource for the subsequent transmission of the first RAT packet based at least in part on the arrival of the first RAT packet for transmitting using the first RAT.

20. The apparatus of claim 18, wherein the first RAT is long term evolution (LTE) and the second RAT is new radio (NR), and wherein the one or more processors are configured to select the next time resource for the subsequent transmission of the first RAT packet in the next upcoming time period using LTE and drop the second RAT packet using NR.

21. The apparatus of claim 18, wherein the first RAT is new radio (NR) and the second RAT is long term evolution (LTE), and wherein the one or more processors are configured to select the next time resource for the subsequent transmission of the first RAT packet in the next upcoming time period using NR and drop the second RAT packet using LTE.

* * * * *